(12) United States Patent
Lee et al.

(10) Patent No.: US 9,245,561 B1
(45) Date of Patent: Jan. 26, 2016

(54) APPARATUS AND METHOD FOR MEASURING SURFACE CHARGE OF A SLIDER

(71) Applicant: Seagate Technology LLC, Cupertino, CA (US)

(72) Inventors: Ju Yong Lee, Kowloon (HK); Won Choul Yang, Kowloon Tong (HK); Shi Jung Kim, Sai Wan Ho (HK)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 14/666,765

(22) Filed: Mar. 24, 2015

(51) Int. Cl.
G11B 21/02 (2006.01)
G11B 5/60 (2006.01)

(52) U.S. Cl.
CPC .................................. G11B 5/6017 (2013.01)

(58) Field of Classification Search
None
See application file for complete search history.

(56) References Cited

U.S. PATENT DOCUMENTS

| 7,233,451 | B2 | 6/2007 | Baumgart et al. |
| 7,405,896 | B2 | 7/2008 | Hirano et al. |
| 7,573,668 | B2 | 8/2009 | Kwon et al. |
| 7,660,068 | B1 | 2/2010 | Baumgart et al. |
| 8,049,984 | B2 | 11/2011 | Contreras et al. |
| 8,630,057 | B2 | 1/2014 | Murthy et al. |
| 8,848,309 | B2 * | 9/2014 | Budde ............................. 360/75 |
| 2014/0240871 | A1 | 8/2014 | Canchi et al. |

* cited by examiner

*Primary Examiner* — K. Wong
(74) *Attorney, Agent, or Firm* — Hollingsworth Davis, LLC

(57) ABSTRACT

An apparatus comprises a slider that includes a fly height sensor. A signal generator is coupled to the slider. The signal generator is configured to generate an AC electrical signal having a DC offset voltage and to adjust the DC offset of the AC electrical signal to a plurality of DC offset voltages. Circuitry is coupled to the fly height sensor and the signal generator. The circuitry is configured to measure fly height of the slider in response to application of the AC electrical signal with varying DC offset voltages to the slider. The circuitry is further configured to determine an extremum of the measured fly heights and generate an output that includes the DC offset voltage associated with the fly height extremum.

20 Claims, 10 Drawing Sheets

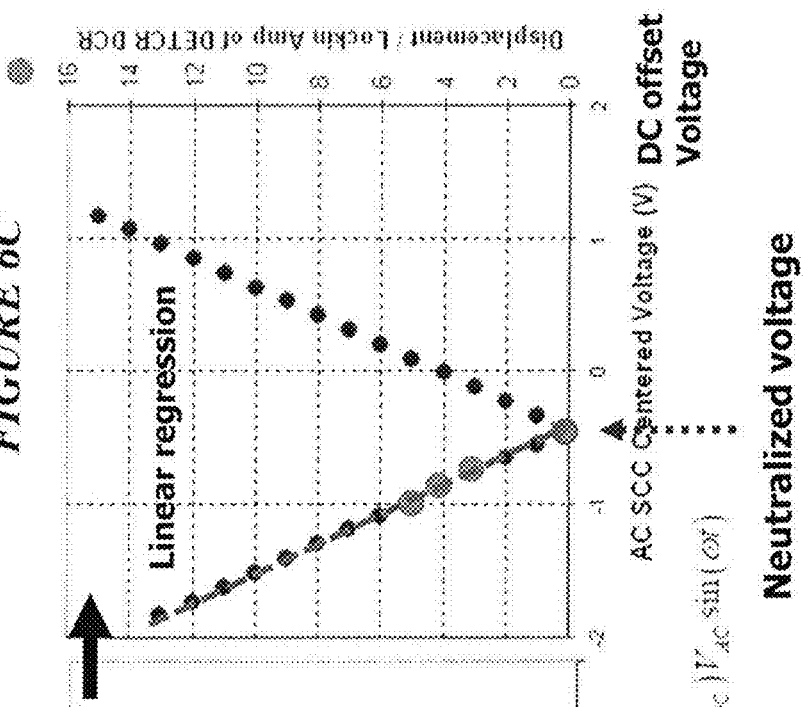
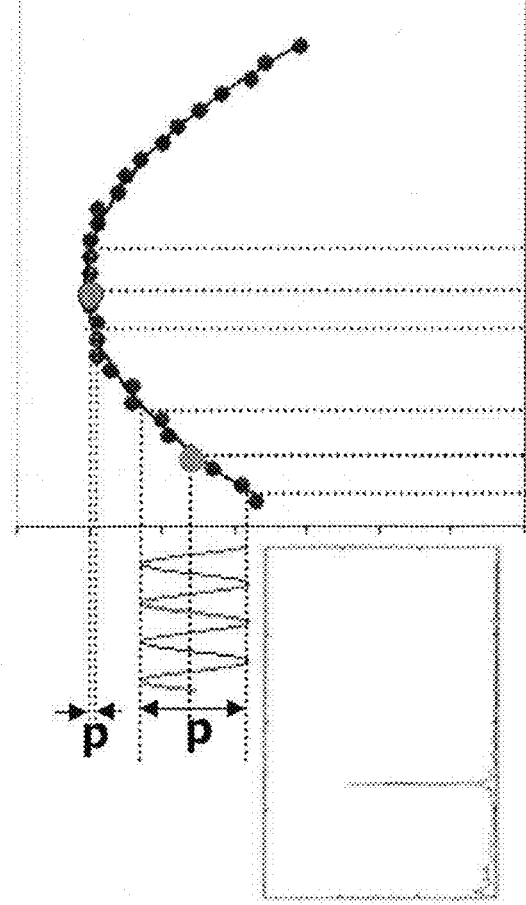
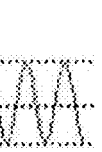
*FIGURE 6C*
*FIGURE 6B*
*FIGURE 6A*

APPARATUS AND METHOD FOR MEASURING SURFACE CHARGE OF A SLIDER

SUMMARY

Embodiments are directed to an apparatus comprising a slider that includes a fly height sensor. A signal generator is coupled to the slider. The signal generator is configured to generate an AC electrical signal having a DC offset voltage and to adjust the DC offset of the AC electrical signal to a plurality of DC offset voltages. Circuitry is coupled to the fly height sensor and the signal generator. The circuitry is configured to measure fly height of the slider in response to application of the AC electrical signal with varying DC offset voltages to the slider. The circuitry is further configured to determine an extremum of the measured fly heights and generate an output that includes the DC offset voltage associated with the fly height extremum.

Embodiments are directed to a method comprising applying an AC electrical signal having a DC offset voltage to a slider of a magnetic recording head during relative movement between the slider and a magnetic recording medium, and measuring a resistance of a sensor on the slider in response to application of the AC electrical signal having the DC offset voltage. The method also comprises adjusting the DC offset of the AC electrical signal to a plurality of DC offset voltages and repeating the applying and measuring processes for each of the DC offset voltages. The method further comprises determining an extremum of the measured sensor resistances, and generating an output that includes the DC offset voltage associated with the sensor resistance extremum.

Other embodiments are directed to a method comprising applying an AC electrical signal having a DC offset voltage to a slider of a magnetic recording head during relative movement between the slider and a magnetic recording medium, and measuring a fly height of the slider in response to application of the AC electrical signal having the DC offset voltage. The method also comprises adjusting the DC offset of the AC electrical signal to a plurality of DC offset voltages and repeating the applying and measuring processes for each of the DC offset voltages. The method further comprises determining an extremum of the measured fly heights, and generating an output that includes the DC offset voltage associated with the fly height extremum.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIGS. 6A-6C are graphs associated with different processes of the methodology shown in FIG. 5;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
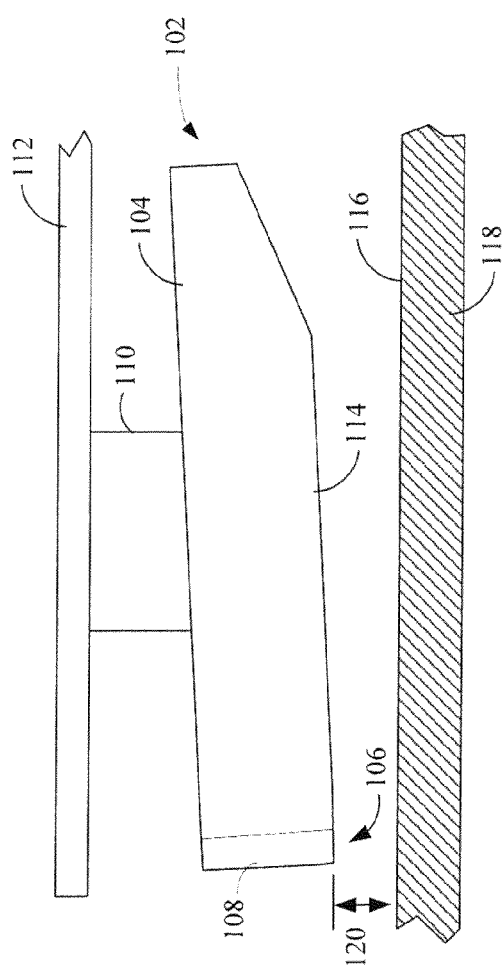
FIGS. 1 and 2 show side views of a slider with which embodiments of the present disclosure can be implemented.

A transducer of a magnetic storage device includes components for recording information to and reading information from a magnetic recording medium. The transducer is usually housed within a small ceramic block called a slider. The slider is passed over the rotating disk in close proximity to a magnetic recording disk. The transducer is used to read data from the disk or write information representing data to the disk.

Sliders are aerodynamically designed to fly on a cushion of air that is generated due to rotating the disks at high speeds. The slider has an air-bearing surface (ABS) that may include rails and a cavity or depression between the rails. The ABS is that surface of the slider nearest to the disk as the disk drive is rotating. Air is dragged between the rails and the disk surface causing an increase in pressure that tends to force the head away from the disk. Air is simultaneously rushing past the cavity or depression in the ABS which produces a lower than ambient pressure area at the cavity or depression. The low-pressure area near the cavity counteracts the higher pressure at the rails. These opposing forces equilibrate so the slider flies over the surface of the disk at a particular fly height. The fly height is the distance between the disk surface and the transducing head. This distance is typically the same as the thickness of an air lubrication film. This film minimizes the friction and resulting wear that would occur if the transducing head and disk were in mechanical contact during disk rotation. During operation of a disk drive, the distance between the slider and the disk is very small, on the order of several nanometers. The constant demand for increasing hard drive recording density has resulted in a drastic decrease in fly height over the years.

Good performance of the disk drive results when a slider is flown as closely to the surface of a disk as possible. Variation in slider fly height represents an increasingly complicated source of problems due to head/media intermittent contact. Intermittent contact induces vibrations that are detrimental to the reading/writing quality and may also eventually result in a recording head crash that causes the loss of data.

The slider body may be formed from a ceramic wafer, and transducers are built on the wafer using conventional semiconductor processing techniques. The transducers are then encapsulated in an overcoat such as alumina. The wafer is sliced to form rows of individual heads and subsequently lapped to an appropriate dimension and surface finish. The individual heads are then diced from the rows to form individual sliders. The interface between the alumina and the substrate typically includes the closest point between the slider and the disk when the slider is passing over the surface of the disk in transducing relation. As a result, if there is any variation in the fly height, this closest point is a likely contact point between the slider and the disk.

One source of variation in the fly height results from the differences in thermal expansion between the ceramic substrate and the transducer during operation of the disk drive. Due to intrinsic properties, the ceramic substrate and the transducer expand at difThrent rates as the slider heats up. Other sources of variation in the fly height that can negatively affect the fly-height of the slider are lubricant-slider interaction, such as tube pickup, and electrostatic force. Triboelectric charging, for example, can result from the buildup of electrical potential between the disk and the slider caused by the rotating disk surface and/or from the buildup of electrical potential in motor bearings. The negative effects of these and other factors can be diminished and/or eliminated by controlling the voltage potential of the slider with respect to the potential of the disk, often referred to as surface charge control (SCC). Controlling the voltage of the slider can reduce slider wear and provide for lower recording head flying heights.

Although lower head/medium clearance provides for improved performance in a hard disk drive, the degree to which the slider can be lowered is limited due to the existence of a potential electric force between the slider and medium that is governed by Coulomb's law. If, however, the potential electric force at the medium can be measured, head/medium clearance can be lowered safely by adding an equivalent potential of opposite polarity to the slider, creating a repulsion force therebetween. Using such an approach, both performance and reliability can be enhanced. One such approach involves determining the highest repulsion point by measuring changes in flying height between the slider and the medium.

Figure 2:
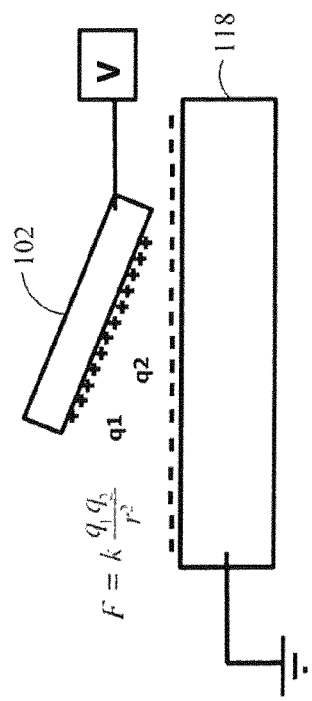

FIG. 1 shows a side view of a slider 102 with which embodiments of the present disclosure can be implemented. The slider 102 includes a slider body 104 and a transducer portion 106 provided within an overcoat region 108 at the trailing edge of the slider 102. The slider 102 is attached via suspension 110 to an arm 112. An air-bearing surface 114 of the slider 102 is shown proximate the surface 116 of a magnetic recording medium 118 (e.g., a disk). The fly height 120 is also indicated. With reference also to FIG. 2, during operation, relative movement between the slider 102 and the medium 118 creates a triboelectric charge (shown as charge q1) on the slider 102 relative to the medium 118 (shown as charge q2). Both contact and near-contact operations accumulate a triboelectric charge on the slider 102 during normal operation and also during take-off and landing.

Figure 3:
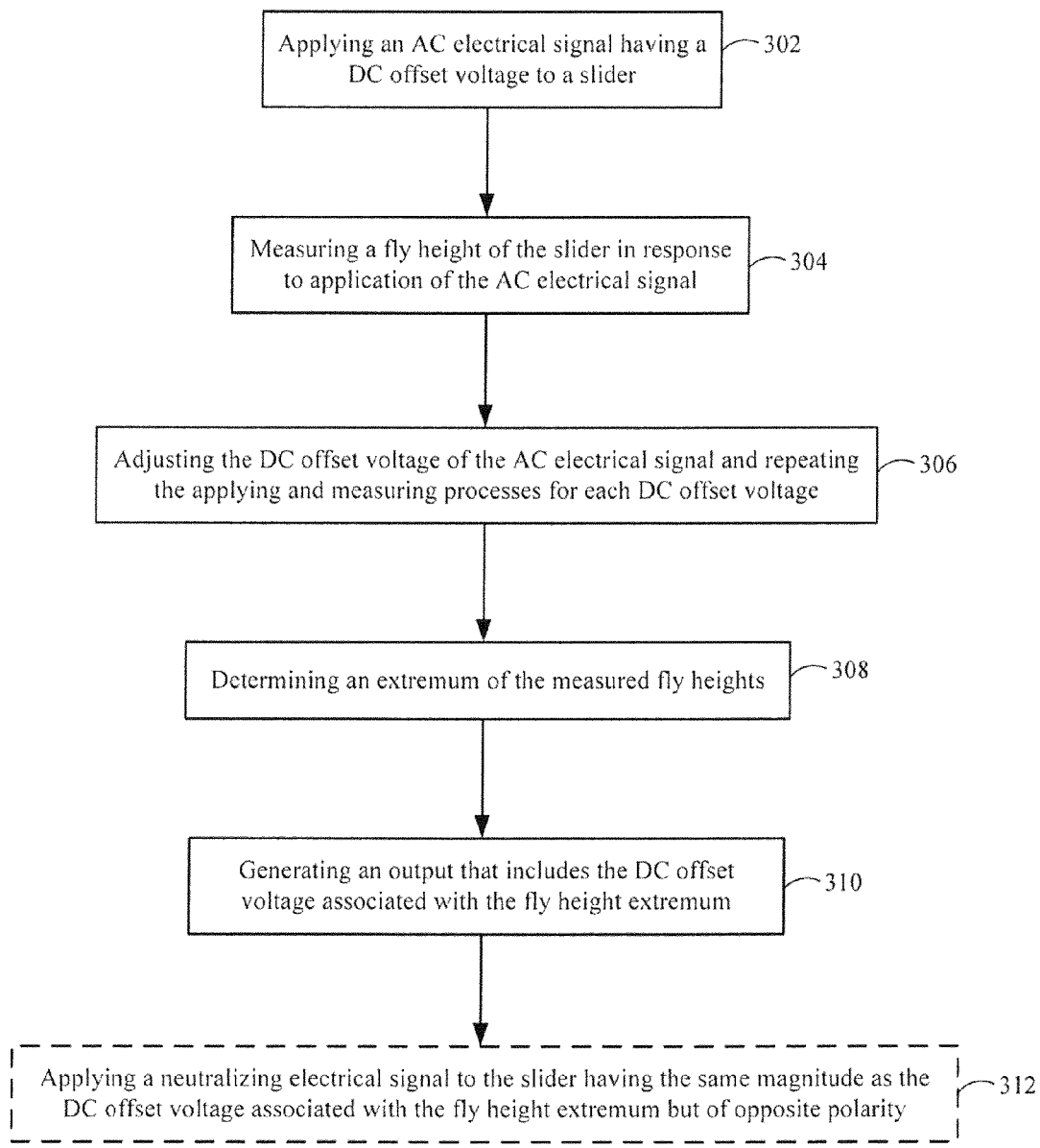
FIG. 3 is a flow diagram illustrating a method of measuring surface charge of a slider in accordance with various embodiments.

FIG. 3 is a flow diagram illustrating a method of measuring surface charge of a slider in accordance with various embodiments. The method involves applying 302 an AC signal having a DC offset voltage to a slider, and measuring 304 a fly height of the slider in response to application of the AC electrical signal to the slider. The method also involves adjusting 306 the DC offset voltage of the AC electrical signal to a multiplicity of values and repeating the applying 302 and measuring 304 processes for each DC offset voltages. The method further involves determining 308 an extremum of the measured fly heights, such as a maximum fly height of the measured fly heights, and generating 310 an output that includes the DC offset voltage associated with the fly height extremum. Some embodiments additionally involve applying 312 a neutralizing electrical signal to the slider having the same magnitude as the DC offset voltage associated with the fly height extremum but of opposite polarity.

Figure 4:
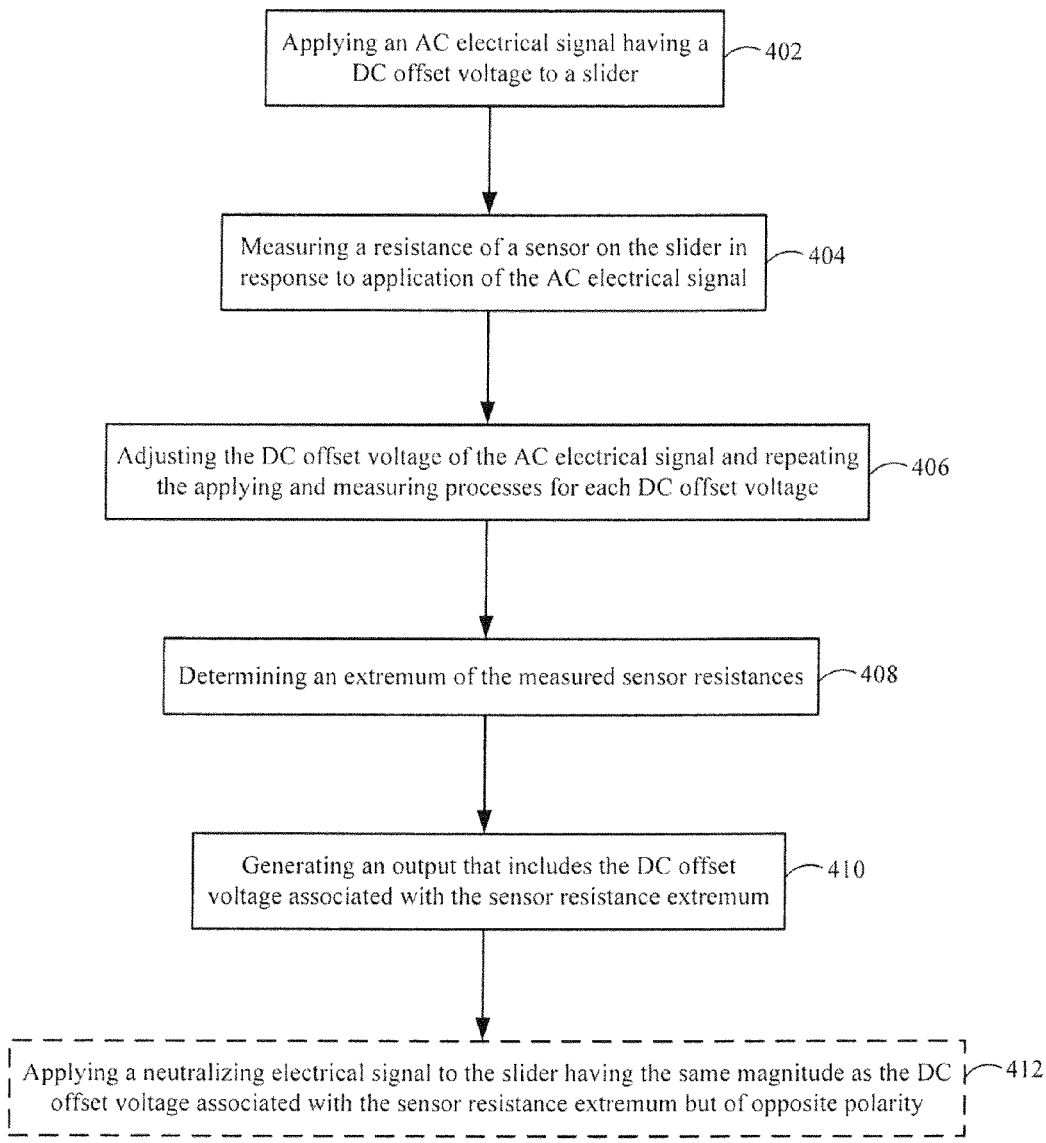
FIG. 4 is a flow diagram illustrating a method of measuring surface charge of a slider in accordance with various embodiments.

FIG. 4 is a flow diagram illustrating a method of measuring surface charge of a slider in accordance with various embodiments. The method involves applying 402 an AC signal having a DC offset voltage to a slider, and measuring 404 a resistance of a sensor on the slider in response to application of the AC electrical signal to the slider. The method also involves adjusting 406 the DC offset voltage of the AC electrical signal to a multiplicity of values and repeating the applying 402 and measuring 404 processes for each DC offset voltages. The method further involves determining 408 an extremum of the measured sensor resistances, such as a minimum of the measured sensor resistances, and generating 410 an output that includes the DC offset voltage associated with the sensor resistance extremum. Some embodiments additionally involve applying 412 a neutralizing electrical signal to the slider having the same magnitude as the DC offset voltage associated with the sensor resistance extremum but of opposite polarity.

Figure 5:
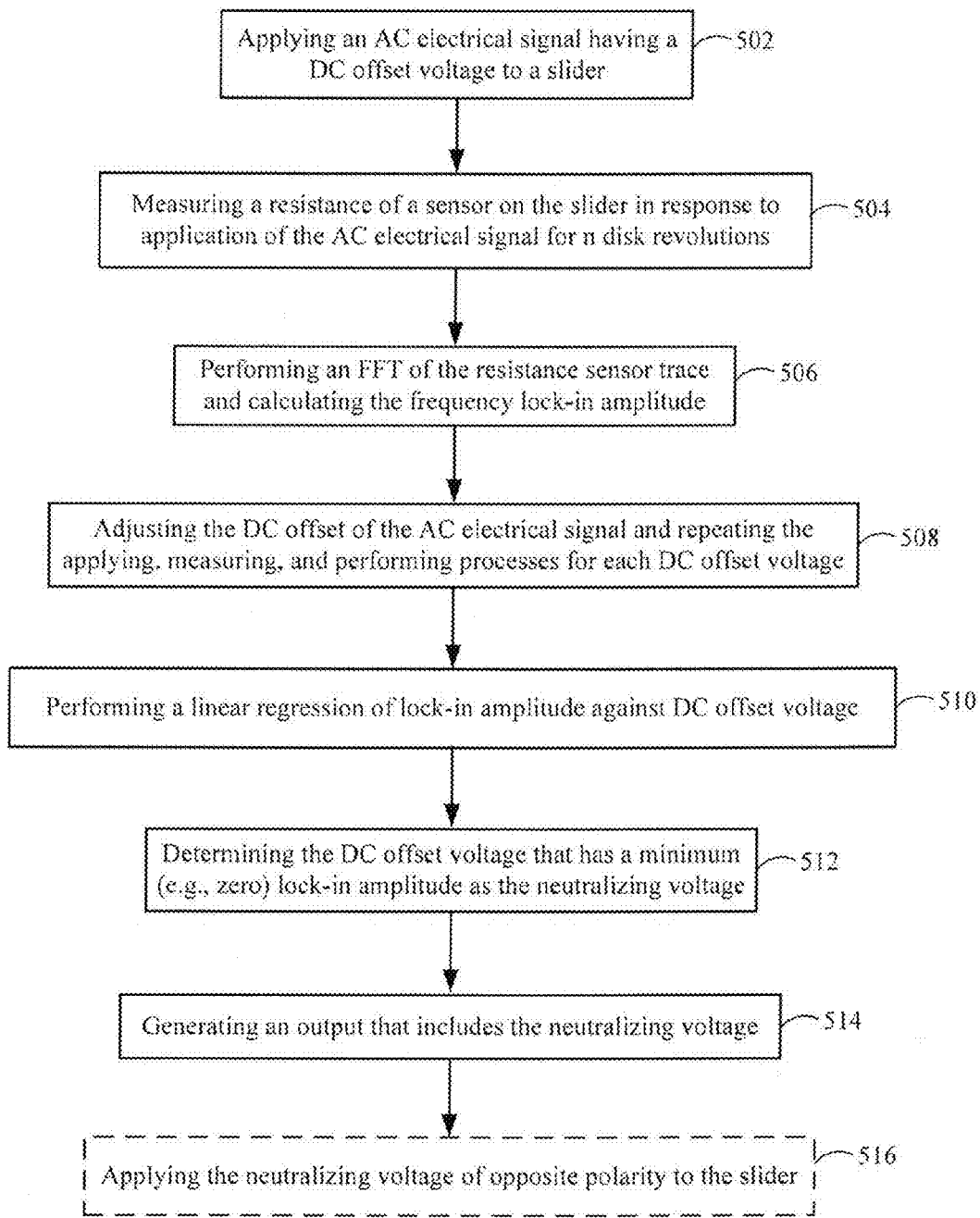
FIG. 5 is a flow diagram illustrating a method of measuring surface charge of a slider in accordance with various embodiments.

FIG. 5 is a flow diagram illustrating a method of measuring surface charge of a slider in accordance with various embodiments. The method involves applying 502 an AC signal having a DC offset voltage to a slider, and measuring 504 a resistance of a sensor on the slider in response to application of the AC electrical signal to the slider for n disk revolutions (e.g., n=3). The method also involves performing 506 a Fast Fourier Transform (FFT) of the resistance sensor trace and calculating the amplitude of the sensor signal at the lock-in frequency (e.g., the frequency of the AC signal), as is shown in FIGS. 6A and 6B. The method further involves adjusting 508 the DC offset voltage of the AC electrical signal to a multiplicity of values and repeating the applying 502, measuring 504, and performing 506 processes for each DC offset voltage. The method also involves performing 510 a linear regression of lock-in amplitude against DC offset voltage, as is shown in FIG. 6C. The method further involves determining 512 the DC offset voltage that has a minimum (e.g., zero) lock-in amplitude, defining this minimum DC offset voltage as the neutralizing voltage, and generating 514 an output that includes the neutralizing voltage. Some embodiments additionally involve applying 516 the neutralizing voltage of opposite polarity to the slider.

Figures 7A, 7B:
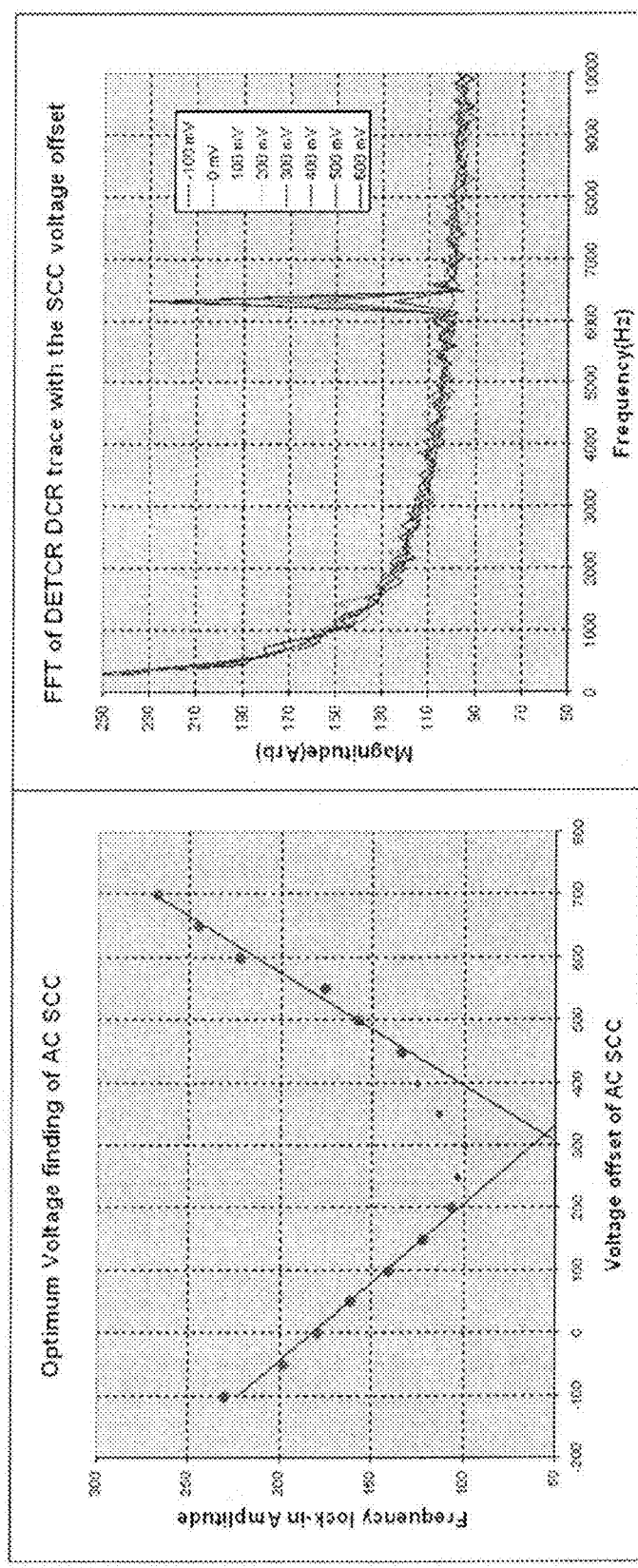
FIGS. 7A and 7B are graphs associated with different processes of the methodology shown in FIG. 5.

FIG. 7A is a graph that illustrates finding of an optimum (e.g., minimum) DC offset voltage of an AC electrical signal that can be generated as part of a surface charge control methodology for a slider in accordance with various embodiments. FIG. 7A is a plot of DC voltage offset of an AC electrical signal versus frequency lock-in amplifier amplitude. It can be seen in FIG. 7A that the plot has an asymmetric shape. FIG. 7B is a graph showing the FFT of the resistance sensor traces resulting from application of an AC signal having different DC offset voltages to a slider. In this illustrative example, the AC signal had a frequency of 6400 Hz. The peak amplitudes of the AC signals with differing DC offset voltage are shown centered around 6400 Hz, which corresponds to the lock-in frequency of the lock-in amplifier. The representative example shown in FIGS. 7A and 7B demonstrates that the AC SCC methodology found an optimum (e.g., minimum) DC offset voltage of 300 mV$_{PP}$. In this representative example, a neutralizing voltage of $-300$ mV$_{PP}$ can be applied to the slider to achieve a desired (e.g., optimal) slider clearance that mitigates a triboelectric charge on the slider.

Figure 8A:
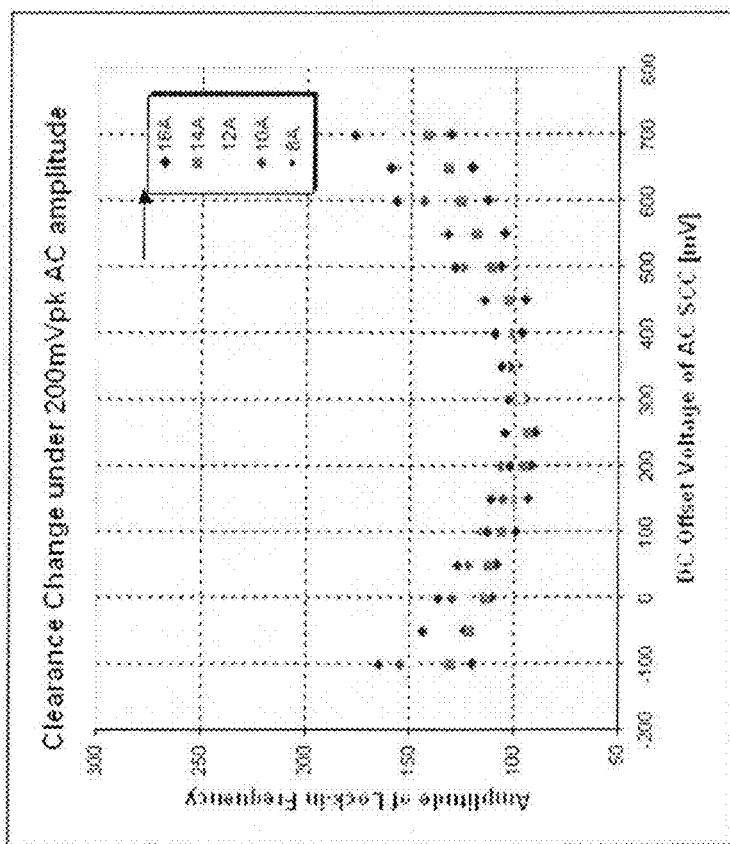
FIGS. 8A and 8B are graphs associated with different processes of the methodology shown in FIG. 5.
Figure 8B:
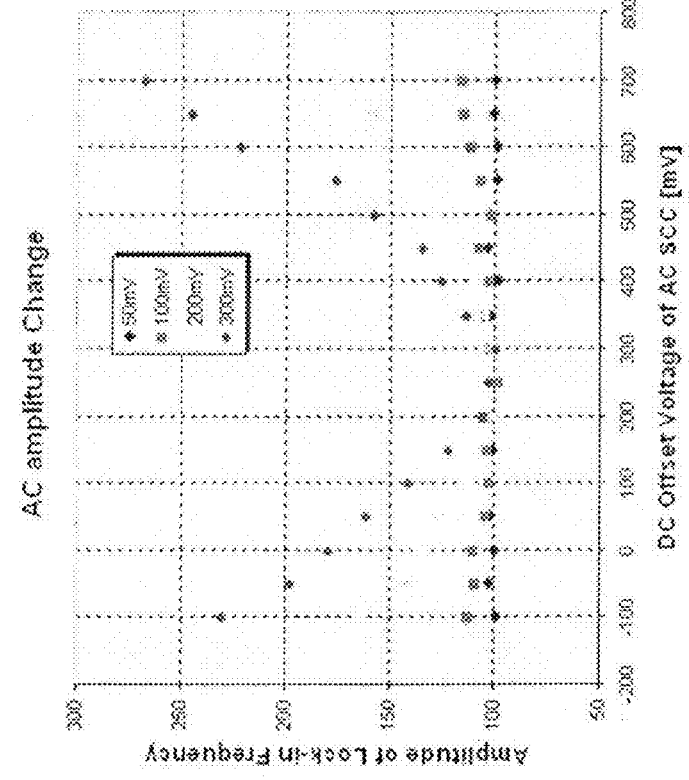

FIG. 8A is a graph showing the effects of AC amplitude change on the resistance sensor response. FIG. 8A is a plot of DC offset voltage of an AC SCC signal versus lock-in amplifier amplitude at the lock-in frequency. The plot of FIG. 8A demonstrates that higher AC signal amplitudes (higher oscillation amplitudes) results in higher fly height changes and higher DC resistance sensor oscillation. It can be seen from FIG. 8A that higher amplitude AC SCC signals have steeper slopes which can facilitate efficient searching for an optimal DC offset voltage (i.e., optimal neutralizing voltage). FIG. 8B is a graph showing slider clearance change in response to an AC SCC signal having an amplitude of 200 mV$_{PP}$ applied to the slider. FIG. 8B is a plot of DC offset voltage of the AC SCC signal versus lock-in amplifier amplitude at the lock-in frequency. FIG. 8B demonstrates that slider clearance does not have an effect on the AC SCC measurement. In other words, regardless of actual slider clearance, an effective (optimal) neutralizing voltage can be determined using an AC SCC methodology of the present disclosure.

Figure 9:
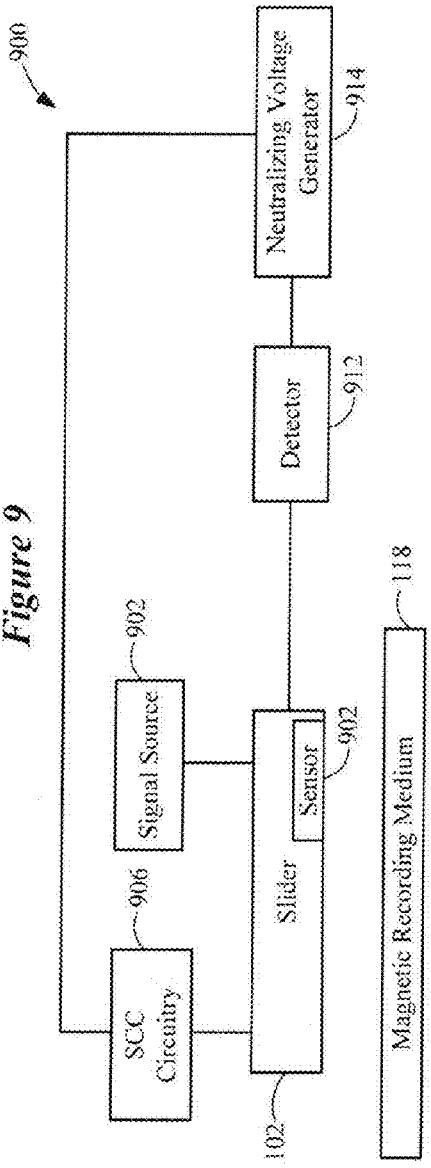
FIG. 9 is a block diagram of an apparatus for generating a neutralizing voltage to facilitate surface charge control of a slider in accordance with various embodiments.

FIG. 9 is a block diagram of an apparatus for generating a neutralizing voltage to facilitate surface charge control of a slider in accordance with various embodiments. The system 900 shown in FIG. 9 includes a slider 102 on which a fly height sensor 904 is provided. Although the sensor 904 can be of varying type, the sensor 904 may be a thermal sensor, such as a resistance temperature sensor composed of materials having a temperature coefficient of resistance (TCR) according to various embodiments. Other types of thermal sensors can be employed, such as a varistor or a thermocouple, for example. One example of a TCR sensor is a dual-ended temperature coefficient of resistance sensor (DETCR), in which each end is coupled to a bias source (e.g., bond pad of the transducer). Another example of a TCR sensor is a ground-split (GS) temperature coefficient of resistance sensor, in which one end of the GSTCR is coupled to ground and the other is coupled to a bias source. A TCR sensor measures temperature change by measuring the change in resistance, or rate of change in resistance, across the sensor. The thermal sensor 904 can be situated near or at the ABS of the slider at a close point (e.g., a close point at the writer), and configured to measure the temperature change at the ABS induced by all thermal condition changes from air pressure, clearance, head operation, and contact, among other changes.

As is further shown in FIG. 9, SCC circuitry 906 is coupled to the slider 102 and configured apply an SCC signal (e.g., a DC SCC signal) to the slider to control the voltage potential of the slider with respect to the potential of a magnetic recording medium 118. A signal source 902 is coupled to the slider 102, such as via the sensor 904, and configured to generate an AC electrical signal having varying DC offset voltages. The sensor 904 is coupled to a detector 912 which is configured to receive an output from the sensor 904 and measure fly heights of the slider in response to application of the AC electrical signal having varying DC offset voltages. The detector 912 is also configured to determining an extremum (e.g., maximum) of the measured fly heights. The detector 912 is coupled to a voltage generator 914 configured to generate a neutralizing voltage of equal magnitude and opposite polarity as the DC offset voltage corresponding to the extremum of the measured fly heights.

Figure 10:
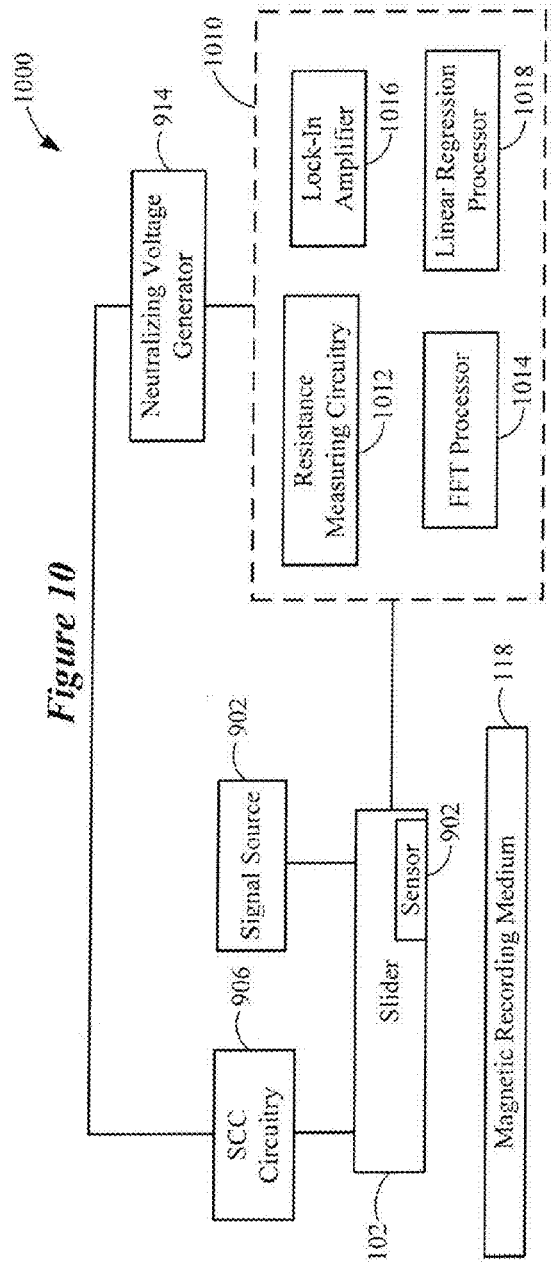
FIG. 10 is a block diagram of an apparatus for generating a neutralizing voltage to facilitate surface charge control of a slider in accordance with various embodiments.

FIG. 10 is a block diagram of an apparatus for generating a neutralizing voltage to facilitate surface charge control of a slider in accordance with various embodiments. The system 1000 shown in FIG. 10 includes many of the components of the embodiment shown in FIG. 9, but includes a detector 1010 implemented in accordance with one embodiment of the disclosure. In the embodiment shown in FIG. 10, the sensor 904 is implemented as a resistance temperature sensor (e.g., a DETCR or a GSTCR). The detector 1010 includes resistance measuring circuitry 1012 configured to measure a resistance of the sensor 904 in response to changes in slider fly height resulting from application of the AC electrical signal having the DC offset voltage to the slider 102. The detector 1010 also includes a processor 1014 configured to perform an FFT of resistance temperature sensor data for each of the DC offset voltages applied to the slider 102. The detector 1010 further includes a frequency lock-in amplifier 1016 configured to determine an amplitude from the FFT data at the frequency of the AC electrical signal for each of the DC offset voltages applied to the slider. The detector 1010 also includes a linear regression processor 1018 configured to perform a linear regression of lock-in amplitude against DC offset voltage. The detector 1010 is configured to determine the DC offset voltage that has a minimum (e.g., zero) lock-in amplitude as the amplitude of the neutralizing voltage. The neutralizing voltage, produced by the voltage generator 914, can be communicated to the slider 102 via the SCC circuitry 906.

It has been determined that use of an AC SCC signal with DC offset voltage is preferred over a DC SCC signal approach for finding the neutralizing SCC bias voltage for several reasons. One reason is that the fly height of the slider or frequency lock-in amplitude is a linear function of DC offset voltage of the AC SCC signal, while a DC SCC signal has a second order polynomial response of fly height as function of DC SCC voltage. Also, as discussed previously, the amplitude of the AC SCC signal can be adjusted (e.g., increased) to achieve a desired slope steepness to facilitate detection and identification of the extremum of the measured sensor resistances.

The AC electrical signal with varying DC offset voltage can be generated in situ a disk drive in several ways. One approach involves the use of a preamplifier that is coupled to the sensor 904. An AC signal can be generated by the preamplifier or circuitry coupled to the preamplifier, and communicated to the slider 102 via the sensor 904. Another approach involves use of disk rotation to facilitate generation of the AC SCC signal or use of voltage through the spindle motor. For example, one technique involves deriving the frequency of the AC SCC signal based on disk RPM (e.g., an AC signal having an amplitude of 500 mV$_{PP}$ at a frequency of 900 Hz, generated from the disk spinning at 5400 RPM-90 Hz*10 cycles in one revolution). Another approach involves use of the servo automatic gain control (AGC), by which the frequency of the AC SCC signal is generated based on the number of servo wedges and the servo sampling frequency. For example, one approach involves 384 servo wedges with the disk spinning at 5400 RPM to generate an AC signal having a frequency of 34 KHz/4 in order to create a suitable sine wave.

Figure 11:
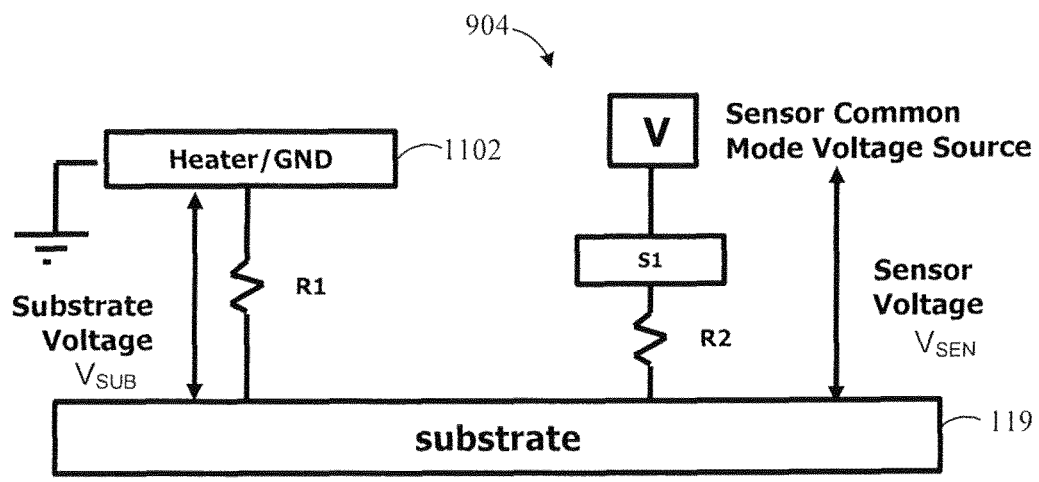
FIG. 11 is a diagram of an apparatus for generating a neutralizing voltage to facilitate surface charge control of a slider in accordance with various embodiments.

FIG. 11 is a diagram of an apparatus for generating a neutralizing voltage to facilitate surface charge control of a slider in accordance with various embodiments. The apparatus shown in FIG. 11 includes a substrate 119 of a slider to which two circuits are coupled. One of the circuits includes a heater 1102 or ground, depending on the particular implementation, coupled to the substrate 119 through a resistance R1 (e.g., 40 KΩ). The voltage potential V$_{SUB}$ across the resistance R1 can be adjusted to control the surface potential of the slider (e.g., such as by applying a neutralizing voltage). The other circuit includes a fly height sensor 904 (S1) coupled to the substrate through a resistance R2 (e.g., 10 KΩ) and to a voltage source V, which is configured to generate an AC SCC signal. The potential between the voltage source V and the substrate 119 corresponds to the sensor voltage, $V_{SEN}$. The potential of the substrate 119 in this representative example is given by $V_{SEN}*40\ K\Omega/(40\ K\Omega+10\ K\Omega)$.

Figure 12:
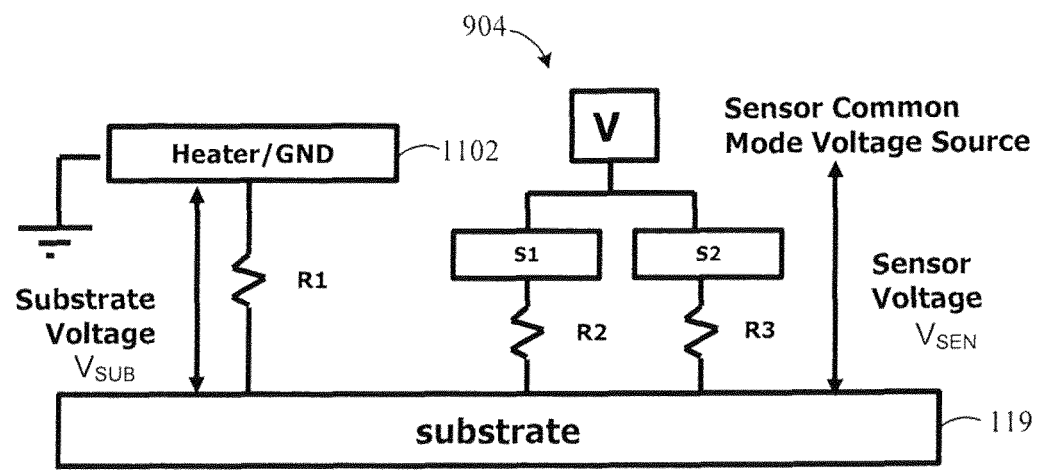
FIG. 12 is a diagram of an apparatus for generating a neutralizing voltage to facilitate surface charge control of a slider in accordance with various embodiments.

FIG. 12 is a diagram of an apparatus for generating a neutralizing voltage to facilitate surface charge control of a slider in accordance with various embodiments. The apparatus shown in FIG. 12 is similar to that illustrated in FIG. 11, except that the sensor 904 includes two fly height sensors (e.g., one at the writer close point and the other at the reader close point). In one implementation, the value of R1 is 40 KΩ, and R2 and R3 are 10 KΩ. Accordingly, the potential of the substrate 119 in this representative example is given by $V_{sEN}*40\ K\Omega/(40\ K\Omega+5\ K\Omega)$.

Figure 13C:
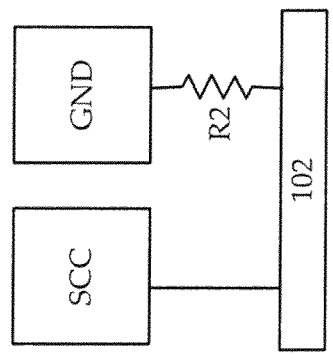
FIGS. 13A-13C illustrate various embodiments for setting/controlling the surface potential of the slider through use of end bond pads of the slider in accordance with various embodiments.
Figure 13B:
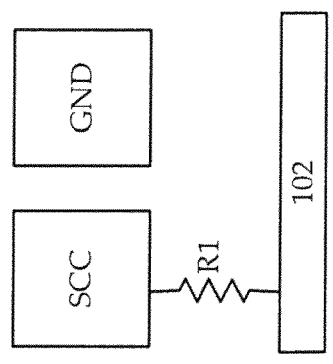
Figure 13A:
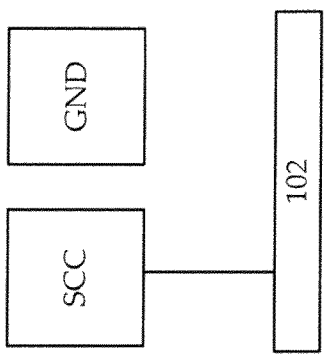

FIGS. 13A-13C illustrate various embodiments for setting/controlling the surface potential of the slider 102 through use of bond pads of the slider 102. In FIG. 13A, surface potential is set by the voltage applied to a dedicated bond pad SCC. In FIG. 13 B, a resistor R1 is fabricated between the dedicated bond pad SCC and the slider 102 wherein the voltage applied through the resistor R1 to the dedicated bond pad SCC establishes the slider surface potential. In FIG. 13C, a resistor R2 is included between the slider 102 and ground, GND, such that a fraction of the voltage applied to the dedicated bond pad SCC is bled to ground, GND, and the remaining voltage establishes the slider surface potential.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. A method, comprising:
setting a surface potential of a slider of a magnetic recording head with respect to a potential of a magnetic recording medium by applying an AC electrical signal having a DC offset voltage to the slider during relative movement between the slider and the medium;
measuring a resistance of a sensor on the slider in response to application of the AC electrical signal having the DC offset voltage;
adjusting the DC offset of the AC electrical signal to a plurality of DC offset voltages and repeating the applying and measuring processes for each of the DC offset voltages;
determining an extremum of the measured sensor resistances; and
generating an output that includes the DC offset voltage associated with the sensor resistance extremum, wherein the DC offset voltage associated with the sensor resistance extremum is indicative of a triboelectric charge on the slider.

2. The method of claim 1, further comprising:
applying a neutralizing electrical signal to the slider having the same magnitude as the DC offset voltage associated with the sensor resistance extremum but of opposite polarity.

3. The method of claim 1, wherein the DC offset voltage extremum is associated with a minimum of the measured sensor resistances.

4. The method of claim 1, wherein:
the resistance of the sensor is measured over a plurality of medium revolutions; and
determining the extremum further comprises performing a Fast Fourier Transform (FFT) of the resistance measurements for each of the DC offset voltages applied to the slider.

5. The method of claim 4, wherein determining the extremum further comprises determining an amplitude from the FFT data at the frequency of the AC electrical signal for each of the DC offset voltages applied to the slider.

6. The method of claim 1, wherein applying the AC electrical signal comprises applying the AC electrical signal to the slider via the sensor.

7. The method of claim 1, wherein applying the AC electrical signal comprises generating a frequency of the AC electrical signal using servo wedges of the medium.

8. A method, comprising:
setting a surface potential of a slider of a magnetic recording head with respect to a potential of a magnetic recording medium by applying an AC electrical signal having a DC offset voltage to the slider during relative movement between the slider and the medium;
measuring a fly height of the slider in response to application of the AC electrical signal having the DC offset voltage;
adjusting the DC offset of the AC electrical signal to a plurality of DC offset voltages and repeating the applying and measuring processes for each of the DC offset voltages;
determining an extremum of the measured fly heights; and
generating an output that includes the DC offset voltage associated with the fly height extremum, wherein the DC offset voltage associated with the fly height extremum is indicative of a triboelectric charge on the slider.

9. The method of claim 8, further comprising:
applying a neutralizing electrical signal to the slider having the same magnitude as the DC offset voltage associated with the fly height extremum but of opposite polarity.

10. The method of claim 8, wherein the DC offset voltage extremum is associated with a maximum of the measured fly heights.

11. The method of claim 8, wherein:
the fly height of the sensor is measured over a plurality of medium revolutions; and
determining the extremum further comprises performing a Fast Fourier Transform (FFT) of the fly height measurements for each of the DC offset voltages applied to the slider.

12. The method of claim 11, wherein determining the extremum further comprises determining an amplitude from the FFT data at the frequency of the AC electrical signal for each of the DC offset voltages applied to the slider.

13. The method of claim 8, wherein applying the AC electrical signal comprises applying the AC electrical signal to the slider via the sensor.

14. The method of claim 8, wherein applying the AC electrical signal comprises generating a frequency of the AC electrical signal using servo wedges of the medium.

15. An apparatus, comprising:
a slider comprising a fly height sensor;
a signal generator coupled to the slider and configured to set a surface potential of the slider with respect to a potential of a magnetic recording medium, the signal generator configured to generate an AC electrical signal having a DC offset voltage and to adjust the DC offset of the AC electrical signal to a plurality of DC offset voltages; and circuitry coupled to the fly height sensor and the signal generator, the circuitry configured to measure fly height of the slider in response to application of the AC electrical signal with varying DC offset voltages to the slider, the circuitry further configured to determine an extremum of the measured fly heights and generate an output that includes the DC offset voltage associated with the fly height extremum;

wherein the DC offset voltage associated with the fly height extremum is indicative of a triboelectric charge on the slider.

16. The apparatus of claim 15, wherein the fly height sensor comprises a resistance temperature sensor.

17. The apparatus of claim 15, wherein the circuitry is configured to communicate the AC electrical signal from the signal generator to the slider via the fly height sensor.

18. The apparatus of claim 15, wherein the circuitry comprises a frequency lock-in amplifier configured to extract an output from the fly height sensor at the frequency of the AC electrical signal.

19. The apparatus of claim 15, wherein the fly height sensor comprises a resistance temperature sensor, and the apparatus further comprises:

a processor configured to perform a Fast Fourier Transform (FFT) of resistance temperature sensor data for each of the DC offset voltages applied to the slider; and a frequency lock-in amplifier configured to determine an amplitude from the FFT data at the frequency of the AC electrical signal for each of the DC offset voltages applied to the slider.

20. The apparatus of claim 15, wherein the signal generator is configured to generate the AC electrical signal using servo data of a magnetic recording medium moving relative to the slider.

\* \* \* \* \*